United States Patent [19]

Melara

[11] Patent Number: 4,667,366

[45] Date of Patent: May 26, 1987

[54] TWIN-WHEEL CASTER FOR FURNITURE ITEMS HAVING A COLLAR SURROUNDING THE PIVOT PIN

[76] Inventor: Francescantonio Melara, Via Ferrarese 8, Bologna, Italy

[21] Appl. No.: 778,733

[22] Filed: Sep. 23, 1985

Related U.S. Application Data

[63] Continuation of Ser. No. 449,715, Dec. 14, 1982, abandoned.

[51] Int. Cl.⁴ ............................................. B60B 33/00
[52] U.S. Cl. ........................................ 16/47; 16/31 R
[58] Field of Search ............ 16/18 CG, 29, 30, 31 R, 16/37, 38, 39, 425, 43, 47, 48, DIG. 24

[56] References Cited

U.S. PATENT DOCUMENTS

| | | | |
|---|---|---|---|
| 3,977,040 | 8/1976 | Sugasawara | 16/30 X |
| 4,077,088 | 3/1978 | Melara | 16/47 |
| 4,120,071 | 10/1978 | Crescenzi | 16/38 X |
| 4,213,226 | 7/1980 | Demrick | 16/38 X |
| 4,219,904 | 9/1980 | Melara | 16/47 |
| 4,399,586 | 8/1983 | McCarroll | 16/31 R |

Primary Examiner—Fred Silverberg
Attorney, Agent, or Firm—Guido Modiano; Albert Josif

[57] ABSTRACT

The caster comprises a pair of coaxial wheels mounted in a support wherein a well is formed receiving a pivot pin for articulating the caster to an item of furniture and being extended by a tubular portion above a support shroud, a stiffening collar member being further provided in overlapping relationship with respect to the tubular portion for tightly engaging the shroud and facilitating the coupling of the caster to the furniture item.

2 Claims, 6 Drawing Figures

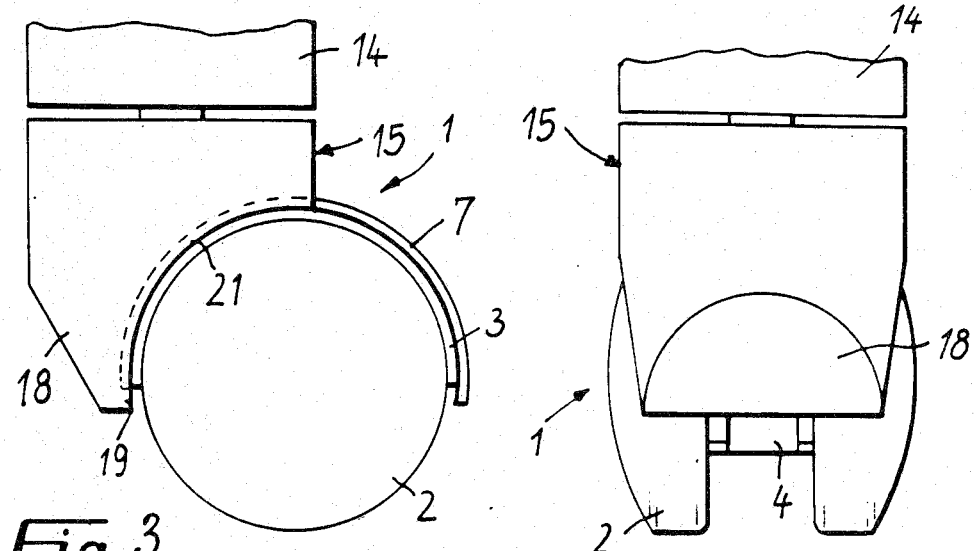
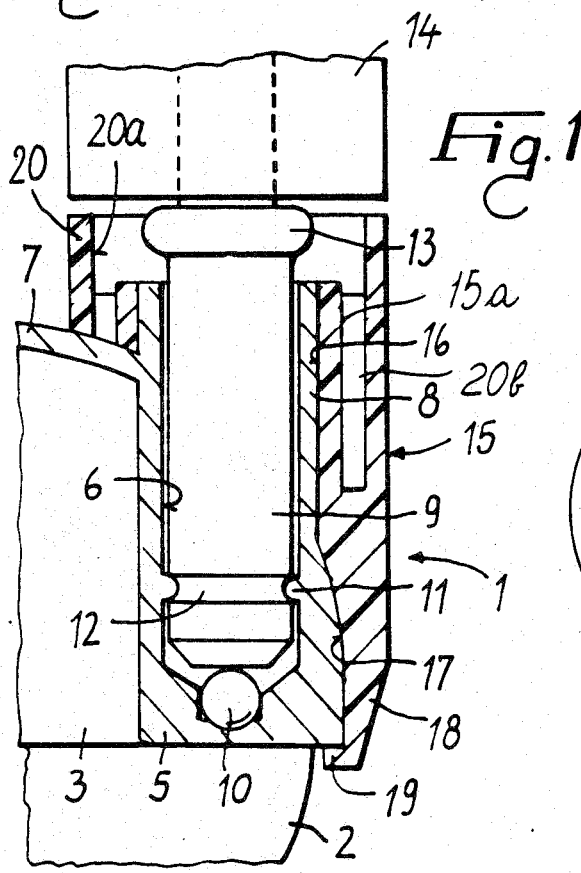
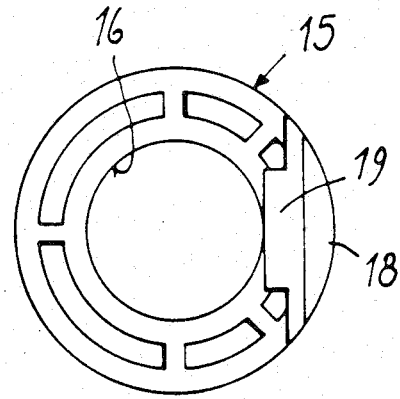

TWIN-WHEEL CASTER FOR FURNITURE ITEMS HAVING A COLLAR SURROUNDING THE PIVOT PIN

This is a continuation of Ser. No. 449.715, filed Dec. 14, 1982, now abandoned.

BACKGROUND OF THE INVENTION

This invention relates to a twin-wheel caster comprising a pair of coaxial wheels.

So-called twin-wheel casters comprise a pair of wheels mounted rotatably on an axle. The axle is carried on a support which includes an upright wall extending between the wheels and has a well formed therein for accommodating a pivot pin provided for assembling the caster to a chair or other item of furniture associated therewith.

The top edge of the upright wall follows the curvature of the wheels, and a shroud or shell is connected thereto which encloses the wheel peripheries.

The well for the articulation pin has a tubular portion which protrudes upwardly from the shroud.

Some problems are encountered with twin-wheel casters especially as regards their attachment to the furniture item. In fact, it has been found that the tubular portion of the well generally falls short of the requisite strength and is also deficient from the aesthetic point of view. This is particularly disadvantageous on account of casters being available in a wide range of sizes, so that any approach to strengthen the region of the tubular portion is bound to involve a number of modifications to the manufacturing equipment.

SUMMARY OF THE INVENTION

Thus, the task of this invention is to provide a twin-wheel caster wherein the aforesaid drawbacks are all substantially reduced.

According to one aspect of the present invention the above task is achieved by a twin-wheel caster comprising a pair of coaxial wheels carried on an axle mounted in a support which includes a vertical wall extending between the wheels and wherein a well is formed which receives a pivot pin for articulating the caster to an item of furniture, said wall having a shroud member enclosing the tops of said wheels, said well being extended above said shroud with a tubular portion thereof, characterized in that a collar member is provided and arranged to overlap said tubular portion and equipped with means of attachment to said shroud.

BRIEF DESCRIPTION OF THE DRAWINGS

Further features and advantages of this invention will be more clearly understood from the following description of some embodiments thereof, as illustrated in the accompanying drawings, where:

FIG. 1 is a sectional view through one portion of the caster concerning its swivel mount to the item of furniture;

FIG. 2 is a bottom view of the collar;

FIG. 3 is a side view of a caster provided with the collar of FIGS. 1 and 2, but having increased dimensions;

FIG. 4 is a front view of the caster shown in Fig. 3;

DESCRIPTION OF THE PREFERRED EMBODIMENTS

Figure 5:
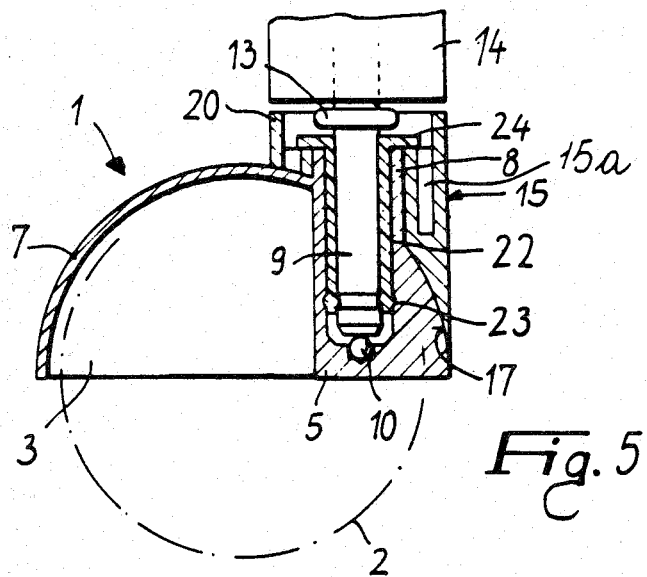
FIG. 5 is a sectional view through a caster, illustrating yet another way of anchoring the collar.

Making reference to FIGS. 1, 2, and the numeral 1 designates generally a twin-wheel caster of conventional design, and, accordingly, no further described in detail. A caster of this type is illustrated, for example, in the U.S. Pat. No. 4,077,088.

Said caster comprises two wheels 2, wherebetween a wall 3 is arranged which defines at its center a hub 4 for the wheel carrier axle.

The wall 3 has, located offcentered with respect to the wheel axle, a boss 5 wherein a vertical well 6 is formed which is open at the top.

The wall 3 is substantially configured as a semicircle and, along its upper peripheral edge, carries a shroud made rigid therewith which encloses the wheels 2. The well 6 is extended above the shroud 7 into a tubular portion 8 which is prolonged upwards to a higher level than the shroud horizontal tangency plane.

In a conventional manner, the well 6 accommodates a pivot pin 9 which bears on the well bottom through a ball 10 and is prevented from sliding out by an annular rib 11 which engages in a mating groove 12 on the pin.

The pin 9 is provided, above the tubular portion 8, with an annular boss 13 which acts as a shoulder for insertion into a specially provided seat in the item of furniture wherewith this caster is associated. In the example shown, it has been assumed that the pin has been inserted into a seat in a leg or foot of a chair, generally indicated at 14.

According to this invention, to strengthen the tubular portion 8, a reinforcing collar structure indicated generally with reference numeral 15 is provided which encircles an opening 16 having the same diameter as the portion 8. The reinforcing collar structure 15 defines, at the bottom, a surface 17 having a pattern which is complementary to that of the shroud 7 thereby, by superimposing the collar 15 onto the tubular portion 8, a perfect joint is achieved between the shroud and reinforcing collar structure. The collar 15 comprises a sector formation 18 which extends along the shroud 7 and downwards, and is provided at its lower end with a dog 19 adapted to engage under the shroud front edge. As visible in the drawing the collar structure 15 has a ring-like body portion 15a snugly surrounding the tubular portion 8.

The above-described collar is completed with a ring or sleeve formation 20 which surrounds a seat 20a for accommodating the boss 13 and conceal it from view. As visible in the drawing the sleeve formation as an inner diameter greater than the outer diameter of said ring-like body portion 15a and downwardly extends into said sector formation 18.

Between sleeve formation 20 and the ring-like body portion 15a, a cylindrical interspace 20b is formed.

It will be apparent that the invention just described fully achieves its objects. In particular, it should be noted that the reinforcing collar structure 15, additionally to strengthen the tubular portion 8, affords the possibility of accomplishing an aesthetically more attractive connection of the caster to the chair foot. In fact, as may be seen in FIG. 1, the collar structure 15 constitutes an extension of sort of the foot 14.

From the manufacturing standpoint, the collar structure involves no alterations of the caster, it being available as an accessory with outside dimensions which can be selected as desired. Thus, the caster is a constant feature and the collar structure is assigned the function of caster adaptation.

FIGS. 3, 4 show in fact a collar structure with a correspondingly larger diameter to fit a larger size foot. In this case, since the collar width exceeds the shroud width, the external body portion formed of said sleeve formation 20 and sector formation 18 of the collar structure is formed at the lower edge thereof, with side flanges 21 which overlap the edges of the shroud, and with the lower dog 19, define the fitting seat therefor.

Of course, the manner how the collar is associated with and secured to the shroud may be manifold. In FIG. 5, a solution which provides for the use of a bushing 22 inserted into the well 6, between the inner wall of the latter and pin 9, is shown. The bushing 22 is provided at the bottom with annular inner and outer projections 23 which engage in corresponding grooves on the pin and well. A flange 24 at the top of the bushing prevents the collar from sliding out by restraining it axially.

Figure 6:
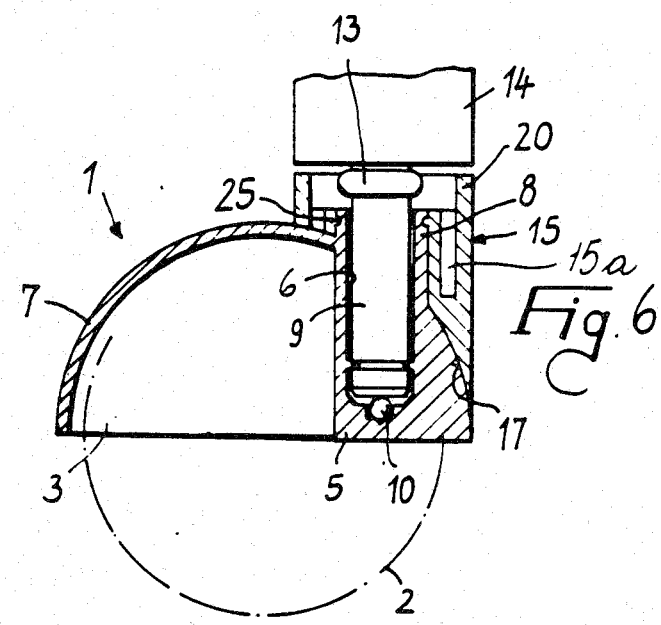
FIG. 6 is a sectional view of another embodiment.

The same result may be achieved in a simpler construction by providing, on the inside of the ring-like body portion of the collar structure, an annular rib 25 which engages in a corresponding annular seat on the tubular portion 8, as shown in FIG. 6.

Where the materials selected allow for it, the connection of the collar to the shroud may be accomplished by force fitting the collar onto the tubular portion, or by adhesive application.

It is a not negligible feature of this invention that this caster may be adapted to suit the item of furniture also under the profile of color matching. In fact, the collar 15 may be either chrome-plated, or gold-plated, or subjected to other surface finish treatments, separately from the shroud. Of course, such treatments would also include any processing directed to provide special embossed patterns and shapes, such as knurling, notching, and the like.

In practicing the invention, the shape of the collar may be any desired one, such as prismatic, conical, or crowned for radiusing to the shroud.

Expediently, the collar would be molded from a plastic material.

I claim:

1. In a twin-wheel caster having a vertical wall, a hub rigid with said wall, an axle supported in said hub, a pair of wheels mounted on said axle, a vertical well formation formed in said wall and located offset from said axle, a pivot pin arranged in said well formation for articulating the caster to an item of furniture, a shroud member on said wall for covering an upper portion of said wheels, said shroud member having lateral edges defining a lateral outline thereof, said well formation having a tubular portion extending upwardly beyond said shroud member, a reinforcing collar structure comprising, a ring-like body portion snugly surrounding said tubular portion to exert a strengthening action thereto,
a sector formation made integral therewith and extending downwardly from said ring-like body portion
and shaped to closely match said well formation, and means for securing said reinforcing collar structure onto said well formation, wherein said reinforcing collar structure further comprises a sleeve formation encircling said ring-like body portion at a distance therefrom to form a seat therebetween and downwardly extending into said sector formation, said sleeve formation and said sector formation forming an external body portion of said collar structure having lower edges with flanges overlapping said lateral edges of said shroud member and wherein said means for securing said reinforcing collar structure onto said well formation comprise on said sector formation a lower edge having a dog-like formation engaging said well formation.

2. In a twin-wheel caster having a vertical wall, a hub rigid with said wall, an axle supported in said hub, a pair of wheels mounted on said axle, a vertical well formation formed in said wall and located offset from said axle, a pivot pin arranged in said well formation for articulating the caster to an item of furniture, a shroud member on said wall for covering an upper portion of said wheels, said shroud member having lateral edges defining a lateral outline thereof, said well formation having a tubular portion extending upwardly beyond said shroud member, a reinforcing collar structure comprising, a ring-like body portion snugly surrounding said tubular portion to impart a strengthening action thereto,
a sector formation made integral therewith and extending downwardly from said ring-like body portion and shaped to closely match said well formation, and
means for securing said reinforcing collar structure onto said well formation,
wherein said reinforcing collar structure further comprises
a sleeve formation encircling said ring-like body portion at a distance therefrom to form a seat therebetween and downwardly extending into said sector formation,
said sleeve formation and said sector formation forming an external body portion of said collar structure having lower edges with flanges overlapping said lateral edges of said shroud member
and wherein said means for securing said reinforcing collar structure onto said well formation comprise on said sector formation a lower edge having a dog-like formation engaging said well formation.

* * * * *